United States Patent
Liu et al.

(10) Patent No.: US 11,835,629 B2
(45) Date of Patent: Dec. 5, 2023

(54) NEIGHBOR-BASED POINT CLOUD FILTER SYSTEM

(71) Applicants: Baidu.com Times Technology (Beijing) Co., Ltd., Beijing (CN); Baidu USA LLC, Sunnyvale, CA (US)

(72) Inventors: Xiang Liu, Beijing (CN); Dongchao Gao, Beijing (CN); Bin Gao, Beijing (CN); Fan Zhu, Sunnyvale, CA (US)

(73) Assignees: BAIDU USA LLC, Sunnyvale, CA (US); BAIDU.COM TIMES TECHNOLOGY (BEIJING) CO., LTD., Beijing (CN)

(*) Notice: Subject to any disclaimer, the term of this patent is extended or adjusted under 35 U.S.C. 154(b) by 475 days.

(21) Appl. No.: 16/758,740

(22) PCT Filed: Mar. 26, 2020

(86) PCT No.: PCT/CN2020/081366
§ 371 (c)(1),
(2) Date: Apr. 23, 2020

(87) PCT Pub. No.: WO2021/189347
PCT Pub. Date: Sep. 30, 2021

(65) Prior Publication Data
US 2022/0299648 A1   Sep. 22, 2022

(51) Int. Cl.
*G01S 17/931* (2020.01)
*G01S 17/89* (2020.01)
(Continued)

(52) U.S. Cl.
CPC ......... *G01S 17/931* (2020.01); *B60W 60/001* (2020.02); *G01S 7/4808* (2013.01);
(Continued)

(58) Field of Classification Search
CPC ...... G01S 17/931; G01S 7/4808; G01S 17/89; B60W 60/001; B60W 2556/45; B60W 2420/52
(Continued)

(56) References Cited

U.S. PATENT DOCUMENTS

| | | | |
|---|---|---|---|
| 10,024,664 B1* | 7/2018 | Gill | G06T 3/60 |
| 2017/0300059 A1* | 10/2017 | Rust | G01S 17/89 |
| 2018/0113204 A1* | 4/2018 | Chon | G01P 21/00 |

FOREIGN PATENT DOCUMENTS

| | | | |
|---|---|---|---|
| CN | 110515054 | * | 11/2019 |
| WO | WO-2020248118 A1 | * | 12/2020 |

OTHER PUBLICATIONS

Abdul Nurunnabi, Robust Segmentation for Large Volumes of Laser Scanning Three-Dimensional Point Cloud Data, Aug. 2016, IEEE Transactions on Geoscience and Remote Sensing, vol. 54 No. 8 (Year: 2016).*

* cited by examiner

*Primary Examiner* — Russell Frejd
*Assistant Examiner* — Matthias S Weisfeld
(74) *Attorney, Agent, or Firm* — WOMBLE BOND DICKINSON (US) LLP

(57) ABSTRACT

A method, apparatus, and system for filtering a point cloud generated by a LIDAR device in an autonomous vehicle is disclosed. A point cloud comprising a plurality of points is generated based on outputs of the LIDAR device. The point cloud is filtered to remove a first set of points in the plurality of points that correspond to noise based on one or more of: point intensity measurements, distances between points, or a combination thereof. Perception data is generated based on the filtered point cloud. Operations of the autonomous vehicle are controlled based on the perception data.

21 Claims, 8 Drawing Sheets

(51) Int. Cl.
  *B60W 60/00* (2020.01)
  *G01S 7/48* (2006.01)
(52) U.S. Cl.
  CPC .......... *G01S 17/89* (2013.01); *B60W 2420/52* (2013.01); *B60W 2556/45* (2020.02)
(58) Field of Classification Search
  USPC .......................................................... 701/24
  See application file for complete search history.

NEIGHBOR-BASED POINT CLOUD FILTER SYSTEM

CROSS-REFERENCE TO RELATED APPLICATION

This patent application is a U.S. National Phase Application under 35 U.S.C. §371 of International Application No. PCT/CN2020/081366, filed Mar. 26, 2020, entitled "A NEIGHBOR-BASED POINT CLOUD FILTER SYSTEM," which is incorporated by reference herein by its entirety.

TECHNICAL FIELD

Embodiments of the present disclosure relate generally to operating autonomous vehicles. More particularly, embodiments of the disclosure relate to processing a point cloud generated by a LIDAR device in an autonomous vehicle.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

LIDAR (Light Detection and Ranging, or a portmanteau of light and radar) techniques have been widely utilized in military, geography, oceanography, and in the latest decade, autonomous driving vehicles. A LIDAR device can estimate a distance to an object while scanning through a scene to assemble a point cloud representing a reflective surface of the object. Individual points in the point cloud can be determined by transmitting a laser pulse and detecting a returning pulse, if any, reflected from the object, and determining the distance to the object according to the time delay between the transmitted pulse and the reception of the reflected pulse. A laser or lasers, can be rapidly and repeatedly scanned across a scene to provide continuous real-time information on distances to reflective objects in the scene. Each full rotation of one laser beam produces one ring of points.

The LIDAR technique is susceptible to noise, such as that caused by dusts or other particles. A noisy point cloud may lead to false positives when obstacles are to be detected.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a method, apparatus, and system for filtering a point cloud generated by a LIDAR device in an autonomous vehicle is disclosed. A point cloud comprising a plurality of points is generated based on outputs of the LIDAR device. The point cloud is filtered to remove a first set of points in the plurality of points that correspond to noise based on one or more of: point intensity measurements, distances between points, or a combination thereof. Perception data is generated based on the filtered point cloud. Operations of the autonomous vehicle are controlled based on the perception data.

In one embodiment, the first set of points that correspond to noise comprise points that correspond to dusts. In one embodiment, filtering the point cloud comprises removing points each of which is associated with an intensity measurement that is below a first intensity threshold. In one embodiment, filtering the point cloud further comprises removing points each of which 1) is associated with an intensity measurement that is below a second intensity threshold, the second intensity threshold being greater than the first intensity threshold, 2) has a first distance to a corresponding neighboring point to the left in a same ring that is above a first distance threshold, and 3) has a second distance to a corresponding neighboring point to the right in the same ring that is above a second distance threshold.

In one embodiment, the first distance threshold and the second distance threshold are different. In another embodiment, the first distance threshold is equal to the second distance threshold. In one embodiment, either of the first distance threshold and the second distance threshold is determined based at least in part on one or more of: a distance between a point considered for removal and the LIDAR device, a quantity of points in the same ring, or a combination thereof.

Figure 1:
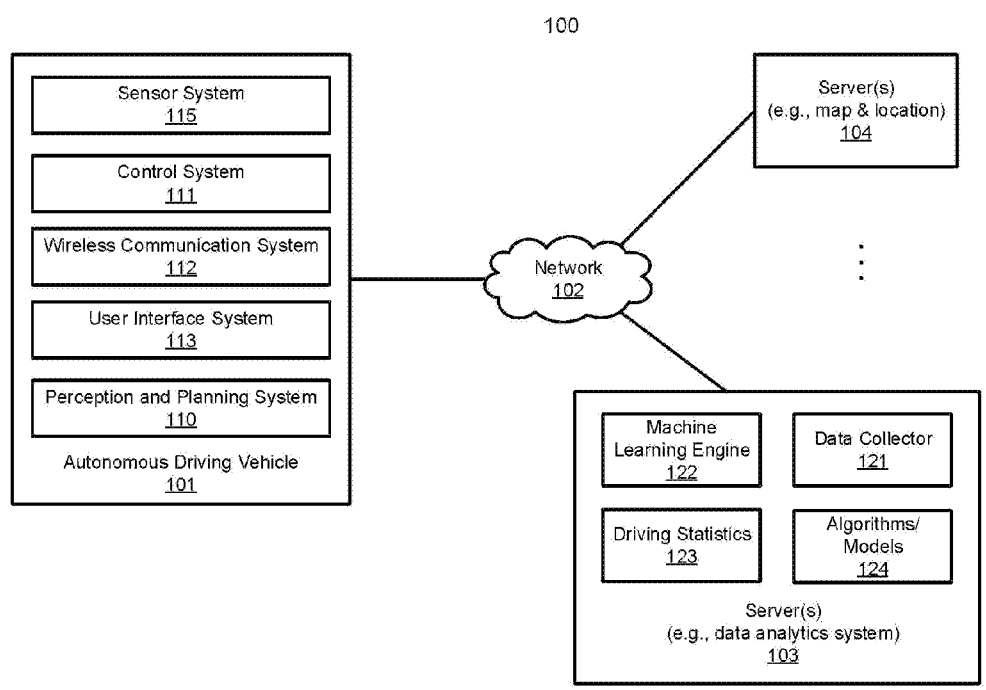
FIG. 1 is a block diagram illustrating a networked system according to one embodiment.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message based protocol, designed originally for multiplex electrical wiring within automobiles, but is also used in many other contexts.

Figure 2:
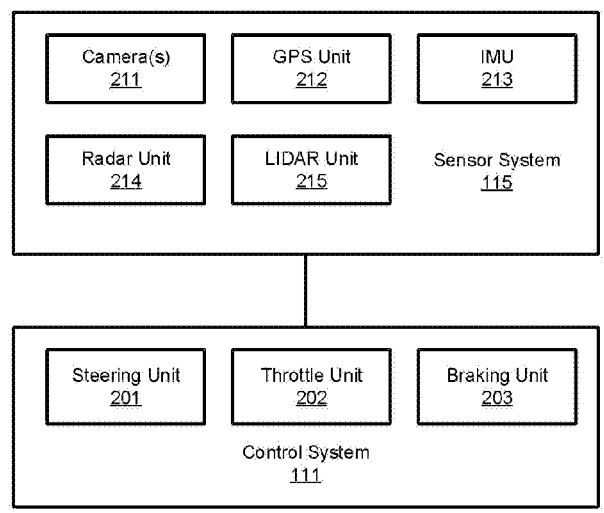
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include an algorithm for filtering the point cloud generated by the LIDAR device. Algorithms 124 can then be uploaded on ADVs to be utilized during autonomous driving in real-time.

Figure 3A:
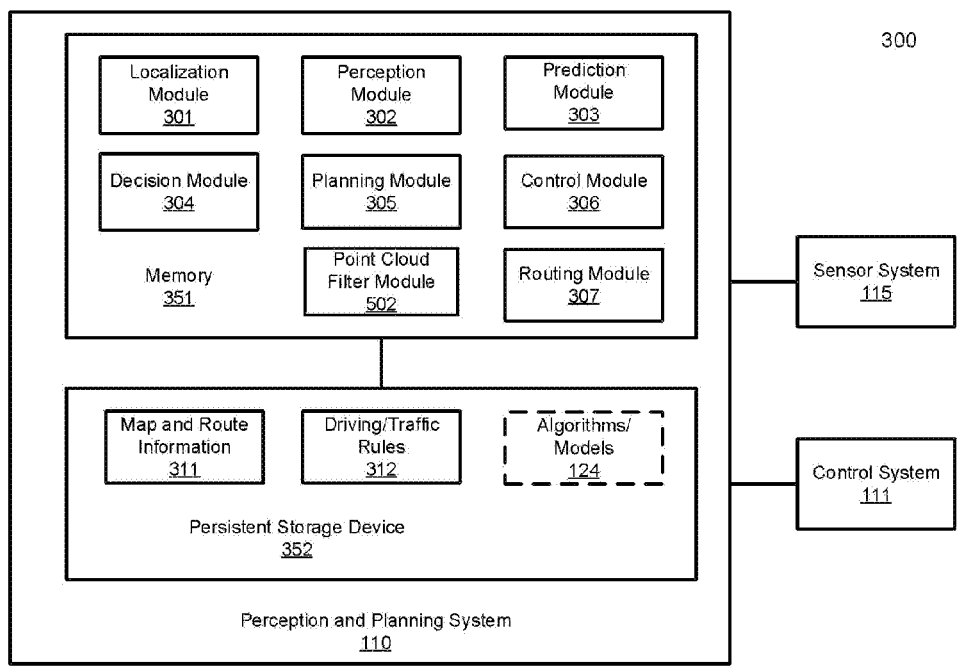
FIGS. 3A-3B are block diagrams illustrating an example of a perception and planning system used with an autonomous vehicle according to one embodiment.
Figure 3B:
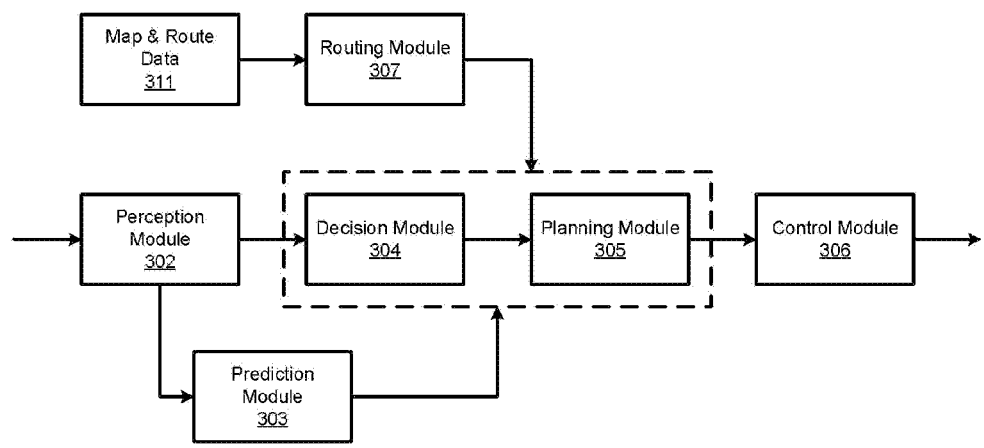

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, point cloud filter module 502.

Some or all of modules 301-307, 502 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307, 502 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

The point cloud filter module 502 filters a point cloud to remove a first set of points in the plurality of points that correspond to noise based on one or more of: point intensity measurements, distances between points, or a combination thereof, as will be described in further detail below. Note that the point cloud filter module 502 may be integrated with another one of modules 301-307, such as, for example, perception module 302.

Figure 4:
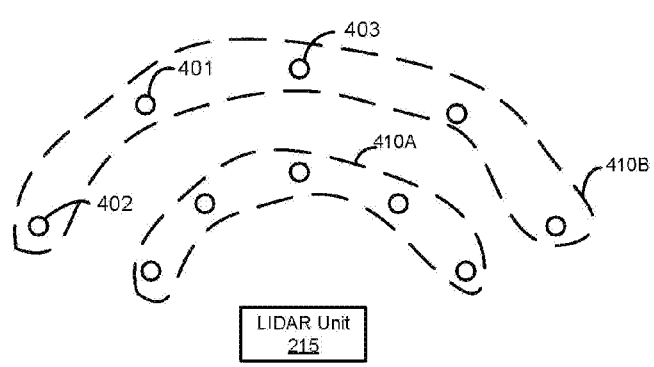
FIG. 4 is a diagram illustrating an example point cloud comprising multiple rings of points based on outputs of a LIDAR device.

Referring to FIG. 4, a diagram 400 illustrating an example point cloud comprising multiple rings of points based on outputs of a LIDAR device. The LIDAR device 215 scans through a scene to assemble a point cloud. Individual points in the point cloud can be determined by transmitting a laser pulse and detecting a returning pulse, if any, reflected from an object, and determining the distance to the object according to the time delay between the transmitted pulse and the reception of the reflected pulse. A laser or lasers, can be rapidly and repeatedly scanned across a scene to provide continuous real-time information on distances to reflective objects in the scene. The LIDAR device may comprise a plurality of laser generation components to scan the scene with multiple laser beams simultaneously. Each full rotation of one laser beam produces one ring of points. In FIG. 4, two ring sections 410A, 410B are shown. It should be appreciated that FIG. 4 is for illustrative purposes only, and that the points and their arrangement as illustrated in FIG. 4 including the number of points, the number of rings, the number of points in each ring, and the shape and location of each ring, do not limit the disclosure. Two neighboring points 402, 403 to the point 401 in the ring 410B are shown. In particular, the point 402 is the neighboring point to the point 401 in a first direction (e.g., to the left) in the same ring 401B, and the point 403 is the neighboring point to the point 401 in a second direction (e.g., to the right) in the same ring 401B.

Figure 5:
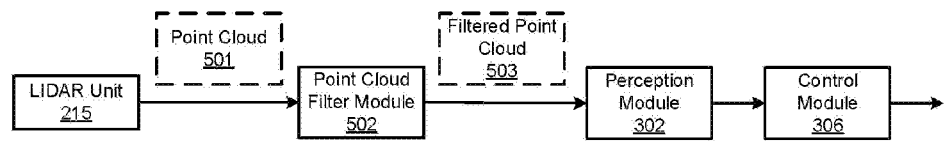
FIG. 5 is a block diagram illustrating various modules usable according to one embodiment of the disclosure.

Referring to FIG. 5, a block diagram 500 illustrating various modules usable according to one embodiment of the disclosure is shown. A point cloud 501 comprising a plurality of points is generated based on outputs of a LIDAR device/unit 215. The point cloud 501 may represent the 3D shapes of features in the surrounding environment. Each point may have its own set of X, Y and Z coordinates, and may be associated with an intensity measurement. The intensity measurement indicates the return strength of the laser pulse that generated the point. The point cloud 501 is filtered at a point cloud filter module 502 to remove a first set of points in the plurality of points that correspond to noise based on one or more of: point intensity measurements, distances between points, or a combination thereof. The noise may be caused by dusts or other particles in the surrounding environment. If the points that correspond to the noise are not removed, false positives may result in the detection of obstacles. Therefore, in one embodiment, the first set of points that correspond to noise comprise points that correspond to dusts.

Next, perception data is generated at the perception module 302 based on the filtered point cloud 503. Operations of the autonomous vehicle are controlled at the control module 306 based on the perception data. In one embodiment, filtering the point cloud comprises removing points each of which is associated with an intensity measurement that is below a first intensity threshold.

In one embodiment, filtering the point cloud further comprises removing points each of which 1) is associated with an intensity measurement that is below a second intensity threshold, the second intensity threshold being greater than the first intensity threshold, 2) has a first distance to a corresponding neighboring point to the left in a same ring that is above a first distance threshold, and 3) has a second distance to a corresponding neighboring point to the right in the same ring that is above a second distance threshold. In different embodiments, the first distance threshold and the second distance threshold may be different, or may be the same. It should be appreciated that each full rotation of one laser beam produces one ring of points, and as a LIDAR device may typically comprise multiple lasers scanning at the same time, a point cloud may comprise a plurality of rings of points. The number of points in a ring can range between a few hundred to a few thousand, and does not limit the disclosure. In one example LIDAR device, each ring comprises approximately 1,800 points.

In one embodiment, either of the first distance threshold and the second distance threshold is determined based at least in part on one or more of: a distance between a point considered for removal and the LIDAR device, a quantity of points in the same ring, or a combination thereof. In a further embodiment, for example, either of the first distance threshold and the second distance threshold is determined using the following formula: distance_threshold=2 * distance_point * π * buffer/num_points_per_ring, where "distance_point" is the distance between the point in question and the LIDAR device, "num_points_per_ring" is the quantity (number) of points in the same ring, and "buffer" is a preset hyperparameter that can be determined empirically. In one embodiment, the value of "buffer" may be approximately 1.2, although it should be appreciated that the value does not limit the disclosure.

Figure 6:
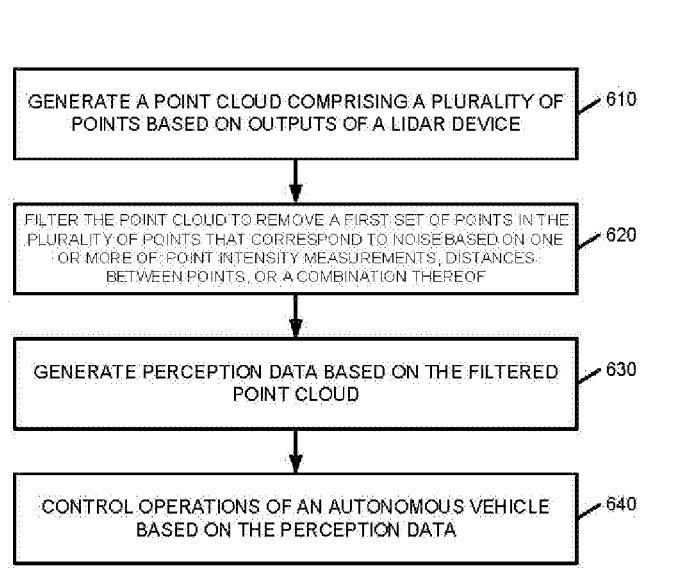
FIG. 6 is a flowchart illustrating an example method for filtering a point cloud generated by a LIDAR device in an autonomous vehicle according to one embodiment.

Referring to FIG. 6, a flowchart illustrating an example method 600 for filtering a point cloud generated by a LIDAR device in an autonomous vehicle according to one embodiment is shown. The process illustrated in FIG. 6 may be implemented in hardware, software, or a combination thereof. At block 610, a point cloud comprising a plurality of points is generated based on outputs of the LIDAR device. At block 620, the point cloud is filtered to remove a first set of points in the plurality of points that correspond to noise based on one or more of: point intensity measurements, distances between points, or a combination thereof At block 630, perception data is generated based on the filtered point cloud. At block 640, operations of the autonomous vehicle are controlled based on the perception data.

Figure 7:
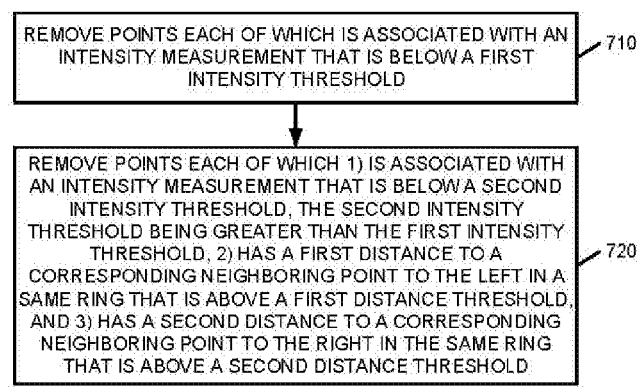
FIG. 7 is a flowchart illustrating an example method for filtering a point cloud generated by a LIDAR device in an autonomous vehicle according to one embodiment.

Referring to FIG. 7, a flowchart illustrating an example method 700 for filtering a point cloud generated by a LIDAR device in an autonomous vehicle according to one embodiment is shown. The process illustrated in FIG. 7 may be implemented in hardware, software, or a combination thereof. The method 700 may be performed at block 620 of FIG. 6. At block 710, points each of which is associated with an intensity measurement that is below a first intensity threshold are removed. At block 720, points each of which 1) is associated with an intensity measurement that is below a second intensity threshold, the second intensity threshold being greater than the first intensity threshold, 2) has a first distance to a corresponding neighboring point to the left in a same ring that is above a first distance threshold, and 3) has a second distance to a corresponding neighboring point to the right in the same ring that is above a second distance threshold are removed.

Therefore, according to embodiments of the disclosure, points in the LIDAR point cloud that correspond to noise, such as the noise caused by dusts or other particles, may be removed. The removal of the noisy points reduces the likelihood of false positives in the obstacle detection process.

Note that some or all of the components as shown and described above may be implemented in software, hardware, or a combination thereof For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims The specification and drawings are, accordingly, to be regarded in an illustrative sense rather than a restrictive sense.

The invention claimed is:

1. A computer-implemented method for operating an autonomous vehicle, the method comprising:
generating a point cloud comprising a plurality of points based on outputs of a LIDAR device, wherein the plurality of points is determined by transmitting a laser pulse and detecting a returning pulse using the LIDAR device;
filtering the point cloud to remove a first set of points in the plurality of points, the first set of points corresponding to noise of the outputs of the LIDAR device in the plurality of points, the noise being determined based on one or more of: point intensity measurements, distances between points, or a combination thereof;
generating perception data based on the filtered point cloud, the perception data including information describing a driving environment surrounding the autonomous vehicle; and
controlling operations of the autonomous vehicle based on the perception data to navigate through the driving environment, wherein filtering the point cloud further comprises removing points each of which 1) is associated with an intensity measurement that is below a second intensity threshold, 2) has a first distance to a corresponding neighboring point to the left in a same ring that is above a first distance threshold, and 3) has a second distance to a corresponding neighboring point to the right in the same ring that is above a second distance threshold, wherein the first distance threshold or the second distance threshold is determined based on a quantity of points in the same ring.

2. The method of claim 1, wherein the first set of points that correspond to noise comprise points that correspond to dusts.

3. The method of claim 1, wherein filtering the point cloud comprises removing points each of which is associated with an intensity measurement that is below a first intensity threshold.

4. The method of claim 3, wherein the second intensity threshold is greater than the first intensity threshold.

5. The method of claim 4, wherein the first distance threshold and the second distance threshold are different.

6. The method of claim 4, wherein the first distance threshold is equal to the second distance threshold.

7. The method of claim 4, wherein either of the first distance threshold and the second distance threshold is determined based at least in part on one or more of: a distance between a point considered for removal and the LIDAR device, a quantity of points in the same ring, or a combination thereof.

8. A non-transitory machine-readable medium having instructions stored therein, which when executed by a processor, cause the processor to perform operations of operating an autonomous vehicle, the operations comprising:
generating a point cloud comprising a plurality of points based on outputs of a LIDAR device, wherein the plurality of points is determined by transmitting a laser pulse and detecting a returning pulse using the LIDAR device;
filtering the point cloud to remove a first set of points in the plurality of points, the first set of points corresponding to noise of the outputs of the LIDAR device in the plurality of points, the noise being determined based on one or more of: point intensity measurements, distances between points, or a combination thereof;
generating perception data based on the filtered point cloud, the perception data including information describing a driving environment surrounding the autonomous vehicle; and
controlling operations of the autonomous vehicle based on the perception data to navigate through the driving environment, wherein filtering the point cloud further comprises removing points each of which 1) is associated with an intensity measurement that is below a second intensity threshold, 2) has a first distance to a corresponding neighboring point to the left in a same ring that is above a first distance threshold, and 3) has a second distance to a corresponding neighboring point to the right in the same ring that is above a second distance threshold, wherein the first distance threshold or the second distance threshold is determined based on a quantity of points in the same ring.

9. The non-transitory machine-readable medium of claim 8, wherein the first set of points that correspond to noise comprise points that correspond to dusts.

10. The non-transitory machine-readable medium of claim 8, wherein filtering the point cloud comprises removing points each of which is associated with an intensity measurement that is below a first intensity threshold.

11. The non-transitory machine-readable medium of claim 10, wherein the second intensity threshold is greater than the first intensity threshold.

12. The non-transitory machine-readable medium of claim 11, wherein the first distance threshold and the second distance threshold are different.

13. The non-transitory machine-readable medium of claim 11, wherein the first distance threshold is equal to the second distance threshold.

14. The non-transitory machine-readable medium of claim 11, wherein either of the first distance threshold and the second distance threshold is determined based at least in part on one or more of: a distance between a point considered for removal and the LIDAR device, a quantity of points in the same ring, or a combination thereof.

15. A data processing system, comprising:
a processor; and
a memory coupled to the processor to store instructions, which when executed by the processor, cause the processor to perform operations of operating an autonomous vehicle, the operations including
generating a point cloud comprising a plurality of points based on outputs of a LIDAR device, wherein the plurality of points is determined by transmitting a laser pulse and detecting a returning pulse using the LIDAR device,
filtering the point cloud to remove a first set of points in the plurality of points, the first set of points corresponding to noise of the outputs of the LIDAR device in the plurality of points, the noise being determined based on one or more of: point intensity measurements, distances between points, or a combination thereof,
generating perception data based on the filtered point cloud, the perception data including information describing a driving environment surrounding the autonomous vehicle, and
controlling operations of the autonomous vehicle based on the perception data to navigate through the driving environment, wherein filtering the point cloud further comprises removing points each of which 1) is associated with an intensity measurement that is below a second intensity threshold, 2) has a first distance to a corresponding neighboring point to the left in a same ring that is above a first distance threshold, and 3) has a second distance to a corresponding neighboring point to the right in the same ring that is above a second distance threshold, wherein the first distance threshold or the second distance threshold is determined based on a quantity of points in the same ring.

16. The data processing system of claim 15, wherein the first set of points that correspond to noise comprise points that correspond to dusts.

17. The data processing system of claim 15, wherein filtering the point cloud comprises removing points each of which is associated with an intensity measurement that is below a first intensity threshold.

18. The data processing system of claim 17, wherein the second intensity threshold is greater than the first intensity threshold.

19. The data processing system of claim 18, wherein the first distance threshold and the second distance threshold are different.

20. The data processing system of claim 18, wherein the first distance threshold is equal to the second distance threshold.

21. The data processing system of claim 18, wherein either of the first distance threshold and the second distance threshold is determined based at least in part on one or more of: a distance between a point considered for removal and the LIDAR device, a quantity of points in the same ring, or a combination thereof.

* * * * *